US012070728B2

(12) United States Patent
Lori

(10) Patent No.: US 12,070,728 B2
(45) Date of Patent: Aug. 27, 2024

(54) METHOD TO DISPENSE FLUID PRODUCTS, AND MACHINE FOR DISPENSING FLUID PRODUCTS

(71) Applicant: COROB S.P.A., San Felice sul panaro (IT)

(72) Inventor: Telesforo Riccardo Lori, Soliera (IT)

(73) Assignee: COROB S.P.A., San Felice Sul Panaro (IT)

( * ) Notice: Subject to any disclaimer, the term of this patent is extended or adjusted under 35 U.S.C. 154(b) by 296 days.

(21) Appl. No.: 17/409,148

(22) Filed: Aug. 23, 2021

(65) Prior Publication Data

US 2022/0062838 A1 Mar. 3, 2022

(30) Foreign Application Priority Data

Aug. 28, 2020 (IT) ........................ 102020000020602

(51) Int. Cl.

*B01F 33/84* (2022.01)
*B01F 35/21* (2022.01)
*B01F 35/71* (2022.01)
*B01F 35/88* (2022.01)
*B01F 101/30* (2022.01)

(52) U.S. Cl.

CPC .......... *B01F 33/84* (2022.01); *B01F 35/2117* (2022.01); *B01F 35/712* (2022.01); *B01F 35/7176* (2022.01); *B01F 35/881* (2022.01); *B01F 35/715* (2022.01); *B01F 2101/30* (2022.01)

(58) Field of Classification Search

CPC .... B01F 33/84; B01F 35/881; B01F 35/7176; B01F 35/2117; B01F 35/712; B01F 2101/30; B01F 35/715

USPC ........................................................... 141/83

See application file for complete search history.

(56) References Cited

U.S. PATENT DOCUMENTS 6,637,471 B2 * 10/2003 Luehrsen ............ B01F 35/2218 222/145.5
2003/0019885 A1 1/2003 Luehrsen et al.
2005/0092386 A1 * 5/2005 Kaufhold ........ B01F 35/718051 141/83
2007/0012378 A1 1/2007 Miller et al.
2007/0084520 A1 * 4/2007 Driessen ............... B01F 35/881 141/2
2007/0095421 A1 * 5/2007 Page ................... B01F 35/7176 141/83

(Continued)

FOREIGN PATENT DOCUMENTS

WO 9934905 A1 7/1999

*Primary Examiner* — Timothy L Maust
*Assistant Examiner* — Christopher M Afful
(74) *Attorney, Agent, or Firm* — Maine Cernota & Curran

(57) ABSTRACT

A method to dispense fluid products is implemented in a dispensing machine by combining gravimetric and volumetric dispensing techniques which comprises at least one containing unit to contain at least one fluid and equipped with a dispensing mean, a dispensing station comprising a dispensing head fluidically connected to the containing unit and equipped with at least one dispensing nozzle, a user interface to enter input data for the preparation of a fluid product, and a control unit connected to the user interface and to the dispensing mean of the containing unit so as to command the dispensing of the fluid.

16 Claims, 3 Drawing Sheets

(56) References Cited

U.S. PATENT DOCUMENTS

| | | | | |
|---|---|---|---|---|
| 2008/0305241 | A1* | 12/2008 | Trevino, III | B01F 35/881 700/239 |
| 2018/0042361 | A1* | 2/2018 | Giron | B05B 12/1409 |
| 2018/0117549 | A1 | 5/2018 | Rossetti et al. | |
| 2022/0062838 | A1* | 3/2022 | Lori | B01F 35/7176 |

* cited by examiner

METHOD TO DISPENSE FLUID PRODUCTS, AND MACHINE FOR DISPENSING FLUID PRODUCTS

RELATED APPLICATIONS

This application claims priority to Italy Patent Application No. 102020000020602, filed Aug. 28, 2020. This application is herein incorporated by reference in its entirety for all purposes.

FIELD OF THE INVENTION

The present invention concerns a method to dispense fluid products.

The method of the present invention is suitable to be implemented in an automatic or semi-automatic dispensing machine for fluid products, mainly for industrial or commercial use, in particular configured to dispense the product according to gravimetric and volumetric techniques.

Embodiments described here also concern the dispensing machine suitable to implement said method.

BACKGROUND OF THE INVENTION

Dispensing machines are known, mainly for industrial or commercial use, for fluid products, to dispense products such as for example paints, impregnants and others, to obtain an objective formulation by mixing, for example, base colors and pigments of the appropriate shades and quantities.

Usually, known dispensing machines are based on techniques for measuring the quantity of fluid product of the volumetric or gravimetric type, or a combination of both.

Dispensing machines based on volumetric techniques control the volume of the product dispensed by controlling the volumetric pump configured to dispense it or by means of flow meters (mass, volumetric, etc.).

In dispensing machines based on gravimetric techniques, on the other hand, the weight of the product dispensed is detected by means of gravimetric measuring devices for measuring the weight of the product, such as for example scales.

In addition, dispensing machines can function in a fully automatic or semi-automatic manner, and in these an intervention by the operator is required in order to manage the different dispensing cycles.

The objective formulation of the fluid products is obtained by mixing at least one base color and at least one pigment so as to obtain a predetermined shade. The base color is usually white or transparent, and the pigment, which on the contrary has a well-defined color, is diluted in it.

Usually, in a final fluid product, the base color has a much greater proportion than the proportion of pigment; for example, the pigment usually represents approximately 5% of the target formulation. Specifically, for example, in a volume of 10.5 kg of final product, there are approximately 10 kg of base color and 0.5 kg of pigment.

Given the difference in volume of the base color and the pigment to be dispensed, and with the aim of reducing dispensing times to a minimum, while respecting the characteristics of the target formulation, the base color is dispensed by means of high-flow pumps, for example of the membrane type, while the pigment is dispensed using other volumetric pumps, such as for example gear or bellows pumps, which have lower flow rates but higher accuracy.

In known machines, the base color and the pigment of the same fluid product are dispensed in sequence, one after the other through the combination of gravimetric techniques (base color) and volumetric techniques (pigment).

One disadvantage of this dispensing method known in the state of the art is that the total dispensing time, which is equal to the sum of the dispensing time of the base color and the dispensing time of the pigment, can be improved.

Another disadvantage of the known method is that, since the base color and the pigment are dispensed one after the other, they do not mix adequately, which subsequently entails a longer time required for the mixing step after the container containing the fluid product has been closed.

There is therefore a need to perfect a method to dispense fluid products which can overcome at least one of the disadvantages of the state of the art.

In particular, one purpose of the present invention is to perfect a method to dispense fluid products which allows to further shorten the dispensing times in order to increase the productivity of known dispensing machines.

Another purpose is to make available a dispensing method which allows to optimize the subsequent mixing step since the base color and the pigments are better amalgamated with each other already during the dispensing step.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, the present application describes a method to dispense fluid products which overcomes the limits of the state of the art and eliminates the defects present therein.

In accordance with some embodiments, there is provided a method to dispense fluid products which comprise at least one base fluid dispensed with gravimetric techniques and at least one additional fluid, for example a coloring fluid, dispensed with volumetric techniques. The method can be implemented in particular on a dispensing machine comprising a dispensing station in correspondence with which there is located a dispensing head equipped with at least two dispensing nozzles.

The method provides a step of dispensing the base fluid through a first nozzle of the dispensing head. The dispensing of the base fluid is advantageously performed with the aid of first dispensing means, for example pumping means, and measured with gravimetric techniques.

There is also provided a step of dispensing the additional fluid through a second nozzle of the dispensing head. The additional fluid is dispensed by means of second dispensing means, preferably of the volumetric type.

According to the invention, the dispensing of the base fluid and the dispensing of the additional fluid occur simultaneously, at least partly.

The base fluid and the additional fluid are configured to be mixed together to form the target formulation. This implies that the base fluid and the additional fluid are dispensed by means of two nozzles of the same dispensing head, in correspondence with the same dispensing station, and suitably into a same collection receptacle. It can also be provided that the simultaneous dispensing of the base fluid and of the additional fluid is carried out into several receptacles positioned on a same device, that is, in correspondence with the same dispensing station.

According to some embodiments, the dispensing station as above also comprises a gravimetric measuring device, and the base fluid and the additional fluid are dispensed into a same receptacle, or into several receptacles, positioned on the gravimetric measuring device.

In a preferential manner, the dispensing of the base fluid is completed after the dispensing of the additional fluid has been completed. In other words, the dispensing of the target formulation is preferably completed with the dispensing of the base fluid. Alternatively, it is possible to provide to complete the dispensing of the base fluid before completing the dispensing of the additional fluid.

According to some embodiments, it is possible to temporarily interrupt the dispensing of one of either the base fluid or the additional fluid, in order to complete this dispensing after having completed the dispensing of the other. Preferably, the dispensing of the base fluid is interrupted in order to complete it after having completed the dispensing of the additional fluid.

Advantageously, the dispensing of one of either the base fluid or the additional fluid occurs mainly as a background task during the dispensing of the other fluid. More advantageously, the volumetric dispensing of the additional fluid occurs as a background task during the gravimetric dispensing of the base fluid.

Preferably, the dispensing of the base fluid and the dispensing of the additional fluid occur simultaneously for at least 50% of their respective durations.

Favorably, the dispensing of the base fluid provides a first time duration, and the dispensing of the additional fluid provides a second time duration. The first and second time durations can be the same or different. Preferably, the first and second time durations are different. More preferably, the first time duration, for the dispensing of the base fluid, is greater than the second time duration, for the dispensing of the additional fluid.

According to one aspect, there is also provided a dispensing machine comprising at least two containing units to contain at least one base fluid and at least one additional fluid. The containing units, in particular the one able to contain the base fluid for which it is necessary to store large quantities in view of the high flow rates dispensed, can be directly integrated in the machine but also outside the dispensing machine, for example being configured as large capacity tanks fluidically connected to the machine.

The containing units are respectively equipped with a gravimetric dispensing mean, to dispense the base fluid, and a volumetric dispensing mean to dispense the additional fluid. The machine also comprises a dispensing station comprising a dispensing head fluidically connected to the containing units and equipped with at least two nozzles to dispense the base fluid and the additional fluid, a user interface to enter input data to prepare a fluid product and a control unit connected to the user interface and to the dispensing means of the containing units to control the dispensing of the fluids on the basis of the input data. The control unit is configured to simultaneously dispense, at least partly, the base fluid and the additional fluid by means of the same dispensing head.

BRIEF DESCRIPTION OF THE DRAWINGS

These and other aspects, characteristics and advantages of the present invention will become apparent from the following description of some embodiments, given as a non-restrictive example with reference to the attached drawings wherein.

Figure 1:
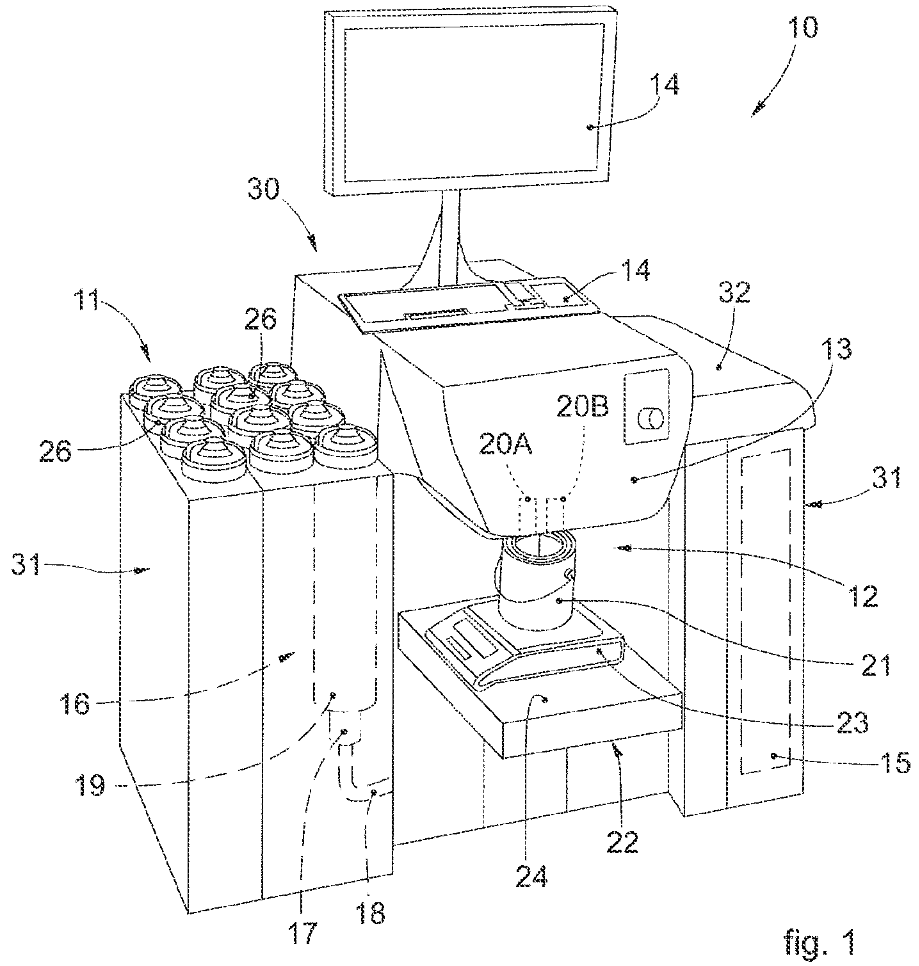
FIG. 1 is a perspective view of a first embodiment of a dispensing machine for dispensing fluid products suitable to implement the method according to the present invention.

To facilitate comprehension, the same reference numbers have been used, where possible, to identify identical common elements in the drawings. It is understood that elements and characteristics of one embodiment can conveniently be combined or incorporated into other embodiments without further clarifications.

DETAILED DESCRIPTION

We will now refer in detail to the possible embodiments of the invention, of which one or more examples are shown in the attached drawings, by way of a non-limiting illustration. The phraseology and terminology used here is also for the purposes of providing non-limiting examples.

With reference to FIG. 1, a dispensing machine 10 for dispensing fluid products is described, comprising a plurality of containing units 11, at least one dispensing station 12, at least one dispensing head 13 for dispensing the fluid products located in correspondence with the dispensing station 12, user interface means 14 and a programmable control unit 15.

The dispensing station 12, the dispensing head 13 and the user interface means 14 are advantageously included in a command and dispensing module 30 of the dispensing machine 10.

The containing units 11 are preferentially enclosed in a suitable containing module 31 configured to connect to the command and dispensing module (FIG. 1). However, it is possible to provide that one or more containing units 11 are disposed outside the containing module 31, for example in the case in which the volume of fluid to be contained is greater than the internal volume of the containing module 31. Examples of external containing units are the so-called drums, IBCs or tanks.

The dispensing machine 10 shown in FIG. 1 comprises a second containing module 31 in which the control unit 15 is integrated, which can however be placed in another manner, for example it can be integrated in the command and dispensing module 30. It should be noted that the containing modules 31 can be provided with an upper lid 32, for example to cover the containing units 11 contained therein.

FIG. 1 shows, by way of example, a dispensing machine 10 of the "stand alone" type, that is, configured for the extemporaneous preparation of fluid products, for example in a commercial establishment.

According to some embodiments, the control unit 15, of the type known in state of the art, can be configured as a processor or a programmable microprocessor or other, capable of storing and processing data.

The control unit 15 is able to comprise calculation algorithms to control the dispensing process.

The calculation algorithms can implement a method to dispense fluid products according to the invention.

In accordance with some embodiments, the user interface means 14 are able to allow the operator to select the formulation to be dispensed and to control and display the dispensing status. The user interface means 14 can comprise displays, for example of the touch sensitive type, a mouse or keyboards or other types of interfaces, for example of the audio type, provided they allow the user to command and control the control unit 15.

According to some embodiments, the containing units 11 are configured to each contain a respective fluid to be dispensed. In particular, at least one of the containing units 11 contains a base fluid, and at least another of the containing units 11 contains an additional fluid, for example a dye or pigment, to be mixed with, or diluted in, the base fluid.

Each containing unit 11 can comprise a container 16 for the corresponding fluid. The container 16 generally comprises an upper aperture which can be closed by means of a lid 26, and through which it is possible to introduce the fluid into the container 16, and one or more exit apertures 17 which can be selectively closed by suitable valve means, which are known. The exit aperture 17 for the fluid is connected to the dispensing head 13 by means of ducts 18 (FIG. 1).

The container 16 can also have a containing body 19, or tank, in which the fluid is contained until the moment it is dispensed. By way of example, for the type of dispensing machine 10 shown in FIG. 1, the containing body 19 can have a volume of between 100 ml and 5 liters.

The dispensing machine 10 also comprises dispensing means, of a known type and not shown, which are operatively associated with the containing units 11 in order to dispense a quantity of the fluid contained therein. For example, the dispensing means can comprise pumps or pump units of a type known in the state of the art.

With the containing units 11 that contain a base fluid there are associated gravimetric dispensing means, preferably with a high flow rate, for example diaphragm pumps. With the containing units 11 that contain an additional fluid there are associated, on the other hand, volumetric dispensing means suitable to dispense smaller flow rates, such as for example gear pumps or bellows pumps.

By gravimetric dispensing means we mean dispensing means controlled by means of gravimetric techniques. By volumetric dispensing means we mean dispensing means controlled by means of volumetric techniques.

Figure 2:
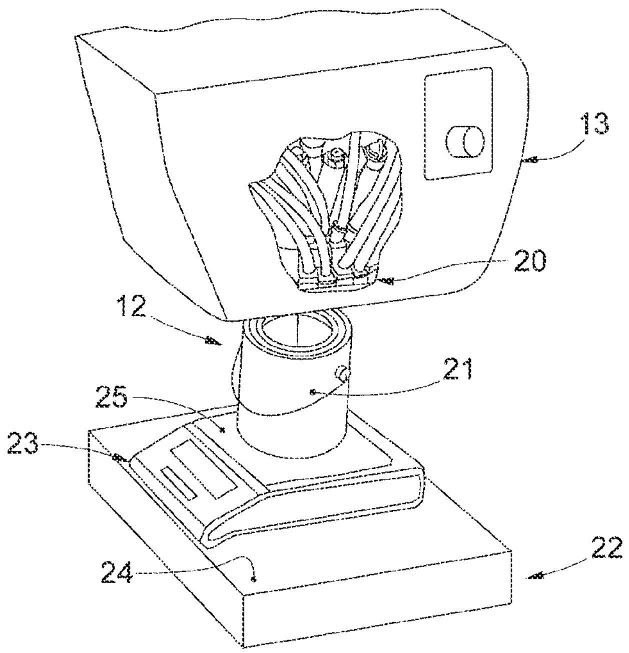
FIG. 2 is an enlarged, detailed perspective view of a dispensing station and of a container for the fluid products dispensed which is associated with a gravimetric device located on a support mean of the dispensing machine of FIG. 1.
Figure 3:
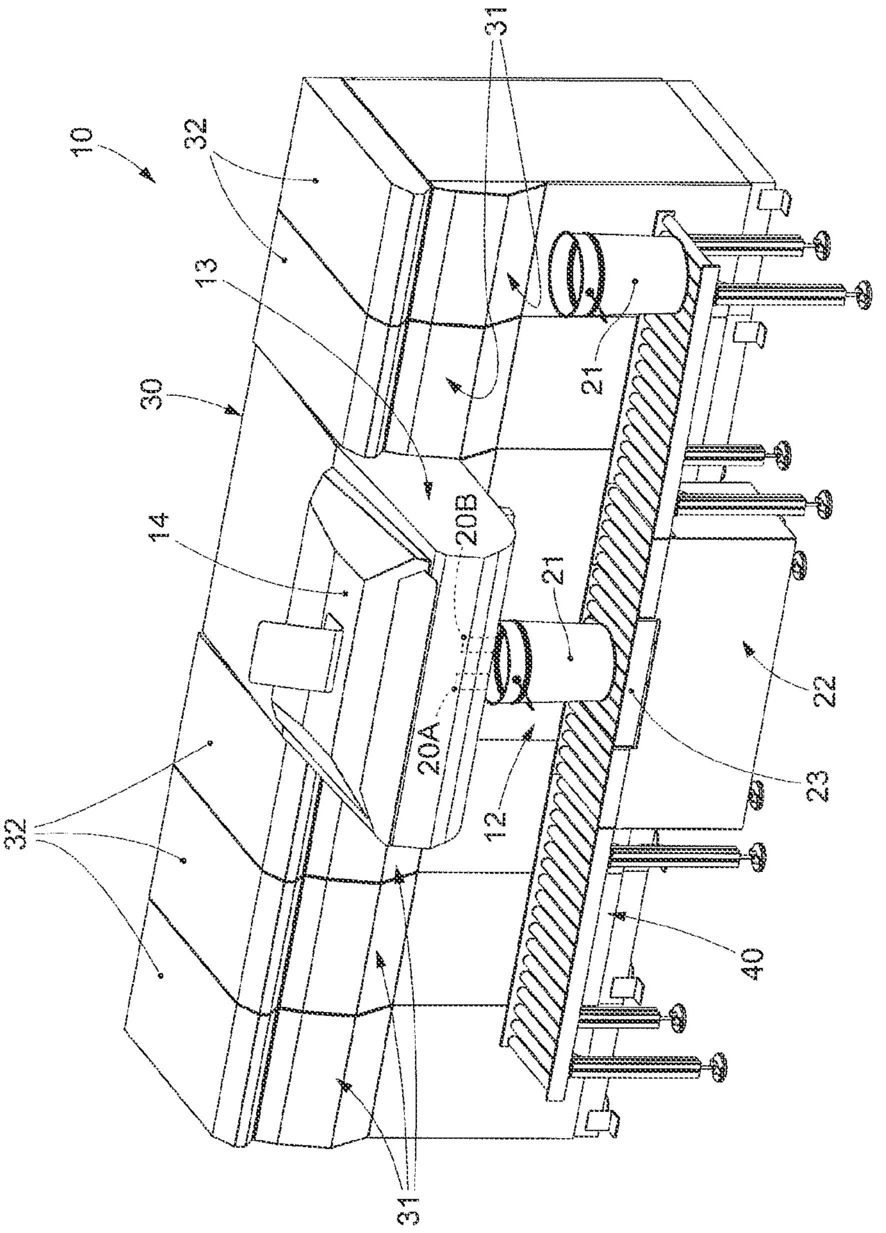
FIG. 3 is a perspective view of a second embodiment of a dispensing machine for dispensing fluid products suitable to implement the method according to the present invention.

In accordance with some embodiments, the dispensing head 13 for dispensing the fluid products comprises at least two dispensing nozzles 20, preferably a plurality of dispensing nozzles 20, each connected to a respective container 16 by means of a respective duct 18 (FIGS. 1, 2 and 3). In particular, a first nozzle 20A is configured to dispense the base fluid, by means of the gravimetric dispensing means, and a second nozzle 20B is configured to dispense the additional fluid, by means of the volumetric dispensing means (FIGS. 1 and 3).

The dispensing head 13 is located in correspondence with a dispensing station 12, in which there are usually disposed one or more receptacles 21 into which the fluid product can be dispensed. The receptacles 21 are advantageously open at the upper part and have a capacity suitable to contain the provided quantity of the target formulation desired, for example they can be configured as tins or other containers, generally cylindrical or truncated-conical in shape, such as a standard color tin.

According to some embodiments, the dispensing head 13 can comprise a plurality of valves (not shown in the drawings) configured to regulate and control the flow of the fluid products.

Advantageously, the dispensing zone 12 can have support means 22 configured to receive resting, in a stable manner, the one or more receptacles 21 and/or one or more measuring devices 23 on which the one or more receptacles 21 can be placed (FIGS. 1 and 2).

The support means 22 can comprise a shelf disposed in such a way that its support surface 24 is substantially parallel to the floor, that is, preferably horizontal, for a more precise functioning of the measuring device 23.

Preferably, the measuring device 23 is of the gravimetric type. It is able to interface with the control unit 15, in order to supply to the latter the data relating to the quantity, or mass, of fluid dispensed into the receptacle 21. It is evident that it is preferable to provide that the control unit 15 is configured to control the dispensing as a function of the quantity or weight of fluid dispensed. In particular, the control unit 15 is configured to automatically stop the dispensing of the fluids when a predetermined total weight of the dispensed fluids is reached.

In the example shown in FIGS. 1 and 2, the measuring device comprises scales 23, as a non-limiting example of a measuring device suitable to measure the weight of the dispensed fluids. For example, the scales 23 can be digital scales, of a type known in the state of the art, having a resolution of 0.02 grams or better, for example 0.01 grams.

The scales 23 favorably comprise a support plane 25 on which the receptacle 21 can be received resting, into which the different fluids are dispensed in order to obtain the target formulation.

FIG. 3 instead shows a second embodiment of the dispensing machine 10, configured for industrial use. In particular, the dispensing machine 10 comprises a plurality of containing modules 31, each comprising one or several containing units 11 as described above. Preferably, one of the containing modules 31 contains the control unit 15, but it is possible to provide that the latter is integrated in the command and dispensing module 30.

It should be noted that in the second embodiment of the dispensing machine 10, the containers 16 can have larger volumes than the first embodiment described above, for example 20 liters or more.

In this embodiment, the dispensing machine 10 also comprises a conveyor device 40 of which at least one segment passes through the dispensing station 12 (FIG. 3), so that it can convey the receptacles 21 there so that they can be filled, and move them away from the dispensing station 12.

Preferably, the conveyor device 40 can be configured as a roller conveyor, as shown in FIG. 3. The receptacles 21 can have a greater capacity than the tins provided in the first embodiment.

Also in this embodiment, the dispensing machine 10 comprises, in correspondence with the dispensing station 12, a measuring device suitable to measure the weight of the dispensed fluids, for example configured as scales 23, preferably of the digital type, completely similar to the one previously described with reference to FIGS. 1 and 2. The measuring device 23 is integrated in the conveyor device 40, with modes that are well known to the person of skill in the art.

With reference in particular to FIGS. 4A-4H, there are described possible embodiments of a method to dispense fluid products that can be implemented on a dispensing machine 10 for dispensing fluid products, for example as described above.

According to some embodiments, the dispensing method preferably comprises receiving, as input datum, a target formulation selected by an operator by means of the user interface 14 and comprising at least one base fluid and an additional fluid, each to be dispensed according to predetermined quantities so as to obtain the target formulation.

Once the input datum has been entered, the control unit 15 advantageously provides to calculate the dosages relating to each fluid to be dispensed in order to have the proportions necessary to obtain the target formulation.

The control unit 15 subsequently commands the dispensing of the base fluid and of the additional fluid so that they are, at least partly, dispensed simultaneously.

In other words, the control unit 15 determines a first time period for the gravimetric dispensing of the base fluid, which has a first duration T1, and a second time period for the volumetric dispensing of the additional fluid, having a second duration T2. The control unit 15 commands the dispensing of the base fluid and of the additional fluid so that the first time period and the second time period at least partly overlap or coincide (FIGS. 4A-4H).

In this way, it is possible to shorten the dispensing times of the fluids to prepare the target formulation. For example, tests and experimental trials have shown that the dispensing times to prepare 10.5 kg of fluid product amount to about 55 seconds, compared to 1 minute and 30 seconds required with sequential dispensing.

Figure 4A:
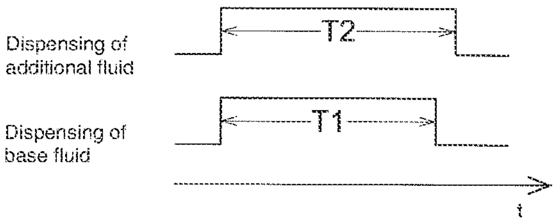
FIGS. 4A-4H are schematic representations of the progress of the dispensing of a base fluid and of an additional fluid over time.
Figure 4B:
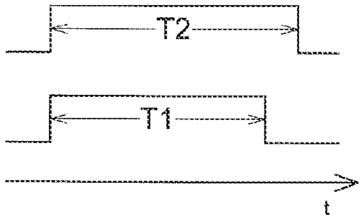
Figure 4C:
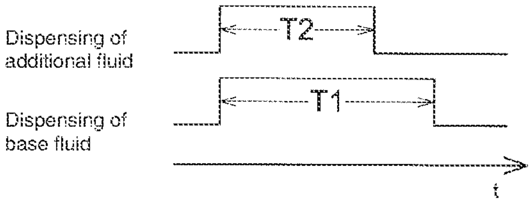

According to a first embodiment, the dispensing of the base fluid and of the additional fluid start at the same time (FIGS. 4A, 4B and 4C). If the first duration T1 and the second duration T2 are the same, the dispensing operations end at the same time.

If, on the other hand, the first duration T1 and the second duration T2 are different, obviously the two dispensing operations will end in two distinct moments. If the first duration T1 is shorter than the second duration T2, the dispensing of the additional fluid ends after the dispensing of the base fluid (FIG. 4B). Conversely, if the first duration T1 is greater than the second duration T2, the dispensing of the base fluid ends after the dispensing of the additional fluid (FIG. 4C).

It is also possible to provide to start the two dispensing operations at two different times, for example to ensure that the two time periods end simultaneously, despite the first duration T1 and the second T2 duration being different, or to make one of the dispensing operations end either before the other or after the other.

Figure 4D:
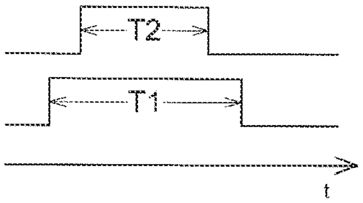

One possible variant of the method provides to have a first duration T1 greater than the second duration T2, and to start the dispensing of the additional fluid after the start of the dispensing of the base fluid, but to end it before the end of the dispensing of the latter (FIG. 4D). In this way, there is a dispensing of the additional fluid that occurs as a background task, and the total duration of the dispensing of the fluids corresponds to the first duration T1. This corresponds to a condition of maximum productivity.

Figure 4E:
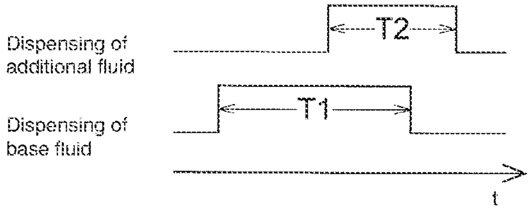

Alternatively, always with a first duration T1 greater than the second duration T2, it is possible to provide to start the dispensing of the additional fluid after the dispensing of the base fluid, and to also make it end afterward (FIG. 4E).

Figure 4F:
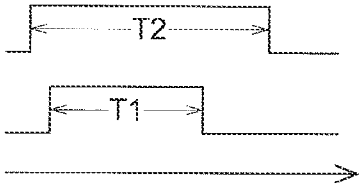
Figure 4G:
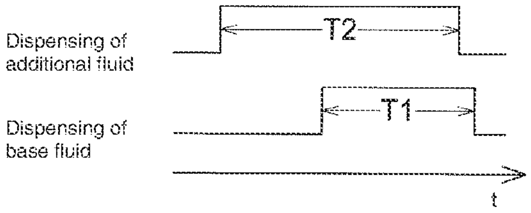

In another embodiment, the first duration T1 is shorter than the second duration T2. In this case, it can be provided to dispense the base fluid as a background task during the dispensing of the additional fluid, making it start after and ending before the dispensing of the additional fluid (FIG. 4F). Alternatively, it can be provided to start the dispensing of the base fluid after the start of the dispensing of the additional fluid, and to make it end after the end of the dispensing of the additional fluid (FIG. 4G).

In any case, it is possible, regardless of the first dispensing duration T1 and the second dispensing duration T2, to choose the start moment of each of the dispensing operations in order to make them end in the desired manner, that is, one after the other or at the same time, depending on requirements.

The fact that the dispensing of the base fluid ends after the end of the dispensing of the additional fluid has the advantage of making a more accurate and faster dispensing available. In fact, by ending with the dispensing of the base fluid, it is possible to control the end of the overall dispensing of the two fluids on the basis of the weight of the fluids in the receptacle 21.

Figure 4H:
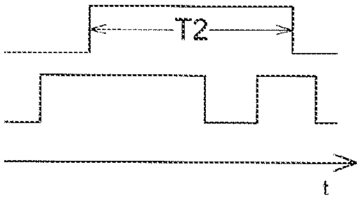

For this purpose, if a user notices, on the basis of the durations T1, T2, that the dispensing of the base fluid is about to end before the dispensing of the additional fluid, there is provided the possibility of temporarily and voluntarily interrupting the dispensing of the base fluid, and to restart it at a later time, in order to make it end after the dispensing of the additional fluid has been completed, as shown in FIG. 4H. Vice versa, it is possible to provide the temporary interruption of the dispensing of the additional fluid in order to complete it after completing the dispensing of the base fluid.

One advantage that derives from this characteristic is that there is a first mixing of the two fluids right from the moment they are dispensed. This makes it possible to provide shorter mixing times after the receptacle 21 is closed, to the advantage of greater productivity of the dispensing machine 10, in particular in the industrial field.

In this sense, it is advantageous that the second dispensing duration T2 of the additional fluid is shorter than the first dispensing duration T1 of the base fluid, so as to allow various temporal configurations for dispensing the two fluids which in any case allow to end the overall dispensing with the dispensing of the base fluid.

It is clear that modifications and/or additions of parts or steps may be made to the dispensing method and dispensing machine as described heretofore, without departing from the field and scope of the present invention as defined by the claims. In the following claims, the sole purpose of the references in brackets is to facilitate reading: they must not be considered as restrictive factors with regard to the field of protection claimed in the specific claims.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method to dispense fluid products comprising:

dispensing at least one base fluid; and dispensing at least one additional fluid, using a dispensing head equipped with at least two dispensing nozzles;

a first nozzle configured to gravimetrically dispense, in a first gravimetric dispensing step, said at least one base fluid; and a second nozzle configured to volumetrically dispense, in a second volumetric dispensing step, said at least one additional fluid, wherein the gravimetric dispensing of said at least one base fluid and the volumetric dispensing of said at least one additional fluid occur, at least partly, simultaneously, wherein gravimetric dispensing of the base fluid is performed over a first duration, wherein volumetric dispensing of the additional fluid is performed over a second duration, wherein said first duration is greater than said second duration, and wherein the volumetric dispensing of said additional fluid occurs as a background task during the gravimetric dispensing of said base fluid.

2. The method as in claim 1, wherein said at least one said base fluid and said at least one additional fluid are dispensed into a same receptacle or into several receptacles, positioned in correspondence with a same dispensing station, in which the dispensing head is comprised.

3. The method as in claim 1, wherein said method comprises: completing the gravimetric dispensing of said at least one base fluid after completing the volumetric dispensing of said at least one additional fluid.

4. The method as in claim 1, wherein said method comprises: temporarily interrupting the dispensing of one of either said at least one base fluid or said at least one additional fluid, and to restart it at a later time in order to complete said dispensing after having completed the dispensing of the other of either said at least one base fluid or said at least one additional fluid.

5. The method as in claim 1, wherein a total dispensing of said fluids that make up the fluid product is controlled by measuring the total weight of dispensed fluids by means of a gravimetric measuring device.

6. The method of claim 1, wherein the method is carried out on a standalone machine.

7. The method as in claim 1, wherein dispensing of the at least one base fluid stops when a predetermined total weight of the combined at least one base fluid and at least one additional fluid is reached.

8. The method as in claim 1, further comprising pausing dispensing of the at least one base fluid to prevent dispensing of the at least one additional fluid from completing first and to resume dispensing of the at least one base fluid prior to concluding dispensing of the at least one additional fluid.

9. A dispensing machine, comprising:

at least two containing units to contain at least one base fluid and at least one additional fluid, and equipped respectively with a gravimetrically controlled dispensing device configured to dispense said at least one base fluid, and with a volumetric dispensing device configured to dispense said at least one additional fluid;

a dispensing station comprising a dispensing head fluidically connected to said containing units and equipped with at least two dispensing nozzles, wherein a first nozzle is configured to gravimetrically dispense said at least one base fluid and a second nozzle is configured to volumetrically dispense said at least one additional fluid;

a user interface to enter input data for the preparation of a fluid product; and a control unit connected to the user interface and to the gravimetrically-controlled dispensing device of said containing units so as to command the gravimetric dispensing of said at least one base fluid and volumetric dispensing of said at least one additional fluid, wherein said control unit is configured to command:

gravimetric dispensing of the base fluid is over a first duration; and volumetric dispensing of the additional fluid over a second duration, wherein said first duration is greater than said second duration, and wherein the controller is further configured to command volumetric dispensing of said additional fluid to occur entirely during the gravimetric dispensing of said base fluid.

10. The dispensing machine as in claim 9, wherein said dispensing machine comprises: a gravimetric measuring device in correspondence with the dispensing station and connected to the control unit, and wherein the control unit is configured to control the gravimetric dispensing of the base fluid and volumetric dispensing of the additional fluid on the basis of the total weight of fluid dispensed.

11. The dispensing machine of claim 9, wherein the dispensing machine is a standalone machine.

12. The dispensing machine as in claim 9, wherein the control unit is configured to automatically stop the dispensing of the at least one base fluid when a predetermined total weight of the dispensed fluids is reached.

13. The dispensing machine as in claim 9, wherein the control unit is configured to pause the dispensing of the at least one base fluid to prevent dispensing of the at least one additional fluid from completing prior to dispensing of the at least one base fluid and to resume dispensing of the at least one base fluid prior to the completion of dispensing of the at least one additional fluid.

14. A method to dispense fluid products comprising:

dispensing at least one base fluid; and dispensing at least one additional fluid, using a dispensing head equipped with at least two dispensing nozzles;

a first nozzle configured to gravimetrically dispense, in a first gravimetric dispensing step, said at least one base fluid; and a second nozzle configured to volumetrically dispense, in a second volumetric dispensing step, said at least one additional fluid, wherein the dispensing of the additional fluid begins while the base fluid is being dispensed and concludes before or when the dispensing of base fluid is complete.

15. The method as in claim 14, wherein dispensing of the at least one base fluid stops when a predetermined total weight of the combined at least one base fluid and at least one additional fluid is reached.

16. The method as in claim 14, further comprising pausing dispensing of the at least one base fluid to prevent dispensing of the at least one additional fluid from completing first and to resume dispensing of the at least one base fluid prior to concluding dispensing of the at least one additional fluid.

* * * * *